United States Patent
Chen et al.

(10) Patent No.: US 9,464,940 B2
(45) Date of Patent: Oct. 11, 2016

(54) BODY TEMPERATURE MEASURING DEVICE

(71) Applicant: AVITA CORPORATION, New Taipei (TW)

(72) Inventors: Chih Ming Chen, New Taipei (TW); Hsuan-Hao Shih, New Taipei (TW); Ta Chieh Yang, New Taipei (TW); Yung Tien Yao, New Taipei (TW)

(73) Assignee: AVITA CORPORATION, New Taipei (TW)

( * ) Notice: Subject to any disclaimer, the term of this patent is extended or adjusted under 35 U.S.C. 154(b) by 581 days.

(21) Appl. No.: 13/846,699

(22) Filed: Mar. 18, 2013

(65) Prior Publication Data

US 2014/0105250 A1 Apr. 17, 2014

(30) Foreign Application Priority Data

Oct. 11, 2012 (TW) .............................. 101219601 U

(51) Int. Cl.
*G01K 1/08* (2006.01)
*G01J 5/02* (2006.01)
*G01J 5/04* (2006.01)

(52) U.S. Cl.
CPC .............. *G01K 1/083* (2013.01); *G01J 5/021* (2013.01); *G01J 5/049* (2013.01)

(58) Field of Classification Search
USPC .................................................. 374/209, 158
See application file for complete search history.

(56) References Cited

U.S. PATENT DOCUMENTS

| | | | | |
|---|---|---|---|---|
| 4,863,281 A * | 9/1989 | Suszynski | ............... | G01J 5/021 206/306 |
| 4,993,424 A * | 2/1991 | Suszynski | .......... | A61B 1/00142 374/158 |
| 5,340,215 A * | 8/1994 | Makita | ...................... | G01J 5/02 374/121 |
| 5,487,607 A * | 1/1996 | Makita | ...................... | A61B 5/01 374/121 |
| 5,833,367 A * | 11/1998 | Cheslock | .................. | G01J 5/02 374/121 |
| 6,786,636 B1 * | 9/2004 | Huang | ...................... | G01J 5/02 374/158 |
| 7,290,926 B2 * | 11/2007 | Yu | .............................. | G01J 5/02 374/121 |
| 7,494,273 B2 | 2/2009 | Huang | | |
| 7,572,056 B2 * | 8/2009 | Lane | ...................... | G01K 1/083 374/158 |
| 8,876,373 B2 * | 11/2014 | Lane | ........................ | G01J 5/021 374/121 |
| 8,882,347 B2 * | 11/2014 | Fraden | ...................... | G01J 5/02 374/158 |
| 2001/0014112 A1 * | 8/2001 | Yamaka | .................... | G01J 5/02 374/158 |
| 2006/0120432 A1 | 6/2006 | Lantz | | |
| 2006/0165152 A1 * | 7/2006 | Walker | .................... | G01J 5/021 374/158 |
| 2008/0137710 A1 * | 6/2008 | Ma | ......................... | G01K 1/083 374/158 |
| 2010/0017163 A1 * | 1/2010 | Yamaguchi | ............... | G01J 5/02 702/99 |
| 2012/0027047 A1 | 2/2012 | Lane et al. | | |
| 2012/0082184 A1 * | 4/2012 | Lu | ........................ | G01K 13/002 374/209 |

* cited by examiner

*Primary Examiner* — Mirellys Jagan
(74) *Attorney, Agent, or Firm* — Raymond Y. Chan; David and Raymond Patent Firm

(57) ABSTRACT

A body temperature measuring device includes a main body, a probe, and a control mechanism. The main body includes a holding part, and an abutting surface arranged at a side of the holding part. The probe is affixed to the main body in a movable manner The probe includes a probe main body, and a fixing structure arranged on the probe main body for fixing a probe cover. The probe cover has a bottom edge. The control mechanism is coupled to the probe for controlling the probe moving between a first position and a second position. Wherein when the probe is at the first position, the probe cover is able to be fixed on the probe; and when the probe moves away from the first position, the abutting surface presses the bottom edge of the probe cover for detaching the probe cover from the probe.

5 Claims, 7 Drawing Sheets

BODY TEMPERATURE MEASURING DEVICE

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a body temperature measuring device, and more particularly, to a body temperature measuring device capable of automatically detaching a probe cover.

2. Description of Related Arts

An ear thermometer is one kind of body temperature measuring devices utilized for measuring ear temperature of a human body in order to obtain actual temperature of the human body. Since the ear thermometer can quickly and correctly measure the body temperature, the ear thermometer is widely used in various kind of medical locations. In order to prevent cross infection, a probe of the ear thermometer is covered by a probe cover before measuring the ear temperature. And after finishing measurement of the ear temperature, the probe cover is detached from the probe for replacing with a new probe cover.

However, the ear thermometer of the prior art does not comprise any mechanism for detaching the probe cover, such that when a user tries to detach the probe cover, the user needs to directly apply force to the probe cover by hand for removing the probe cover from the probe. The above method for detaching the probe cover is not efficient, and may damage the probe due to improper force applied by the hand.

SUMMARY OF THE PRESENT INVENTION

The present invention provides a body temperature measuring device comprising a main body, a probe, and a control mechanism. The main body comprises a holding part, and an abutting surface arranged at a side of the holding part. The probe is affixed to the main body in a movable manner The probe comprises a probe main body, and a fixing structure arranged on the probe main body for fixing a probe cover. The probe cover has a bottom edge. The control mechanism is coupled to the probe for controlling the probe moving between a first position and a second position. Wherein when the probe is at the first position, the probe cover is able to be fixed on the probe; and when the probe moves away from the first position, the abutting surface presses the bottom edge of the probe cover for detaching the probe cover from the probe.

In contrast to the prior art, the body temperature measuring device of the present invention can utilize the control mechanism to quickly and efficiently detach the probe cover without directly applying force to the probe cover by hand for removing the probe cover from the probe. Therefore, the body temperature measuring device of the present invention is more efficient to use.

These and other objectives of the present invention will no doubt become obvious to those of ordinary skill in the art after reading the following detailed description of the preferred embodiment that is illustrated in the various figures and drawings.

DETAILED DESCRIPTION OF THE PREFERRED EMBODIMENT

Figure 1:
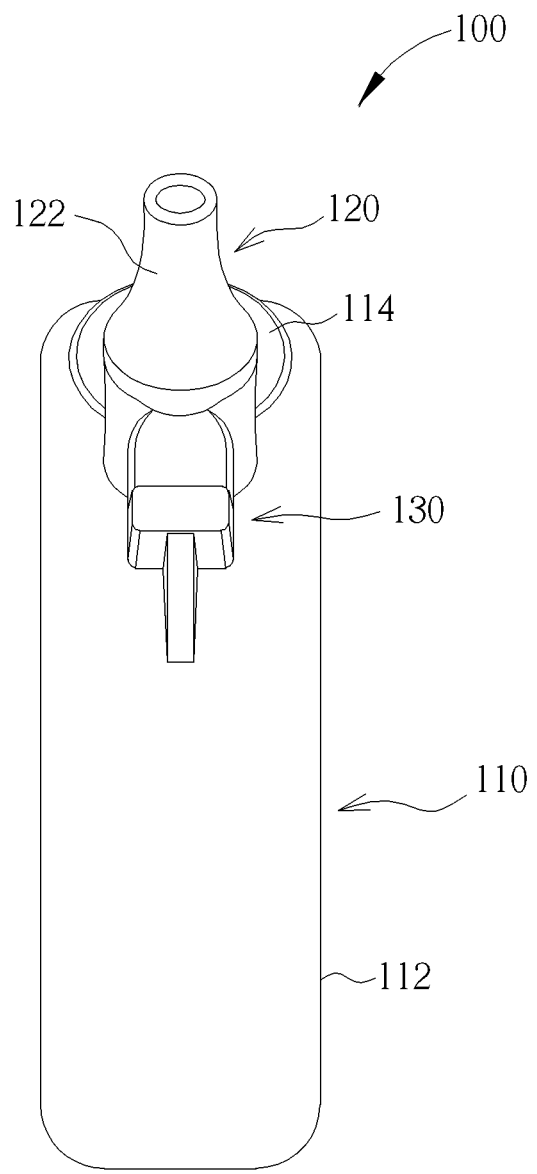
FIG. 1 is a diagram showing a first embodiment of a body temperature measuring device of the present invention.
Figure 2:
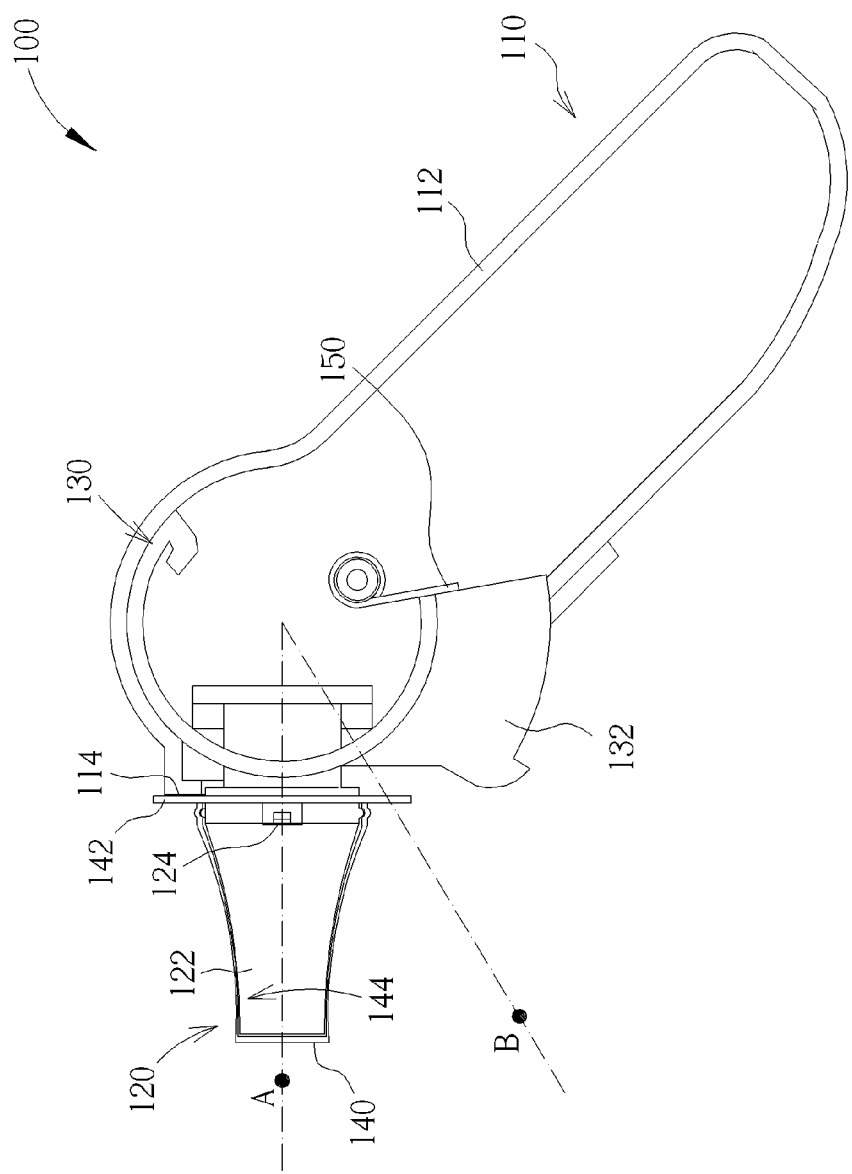
FIG. 2 is a diagram showing a probe of the body temperature measuring device of FIG. 1 located at a first position.
Figure 3:
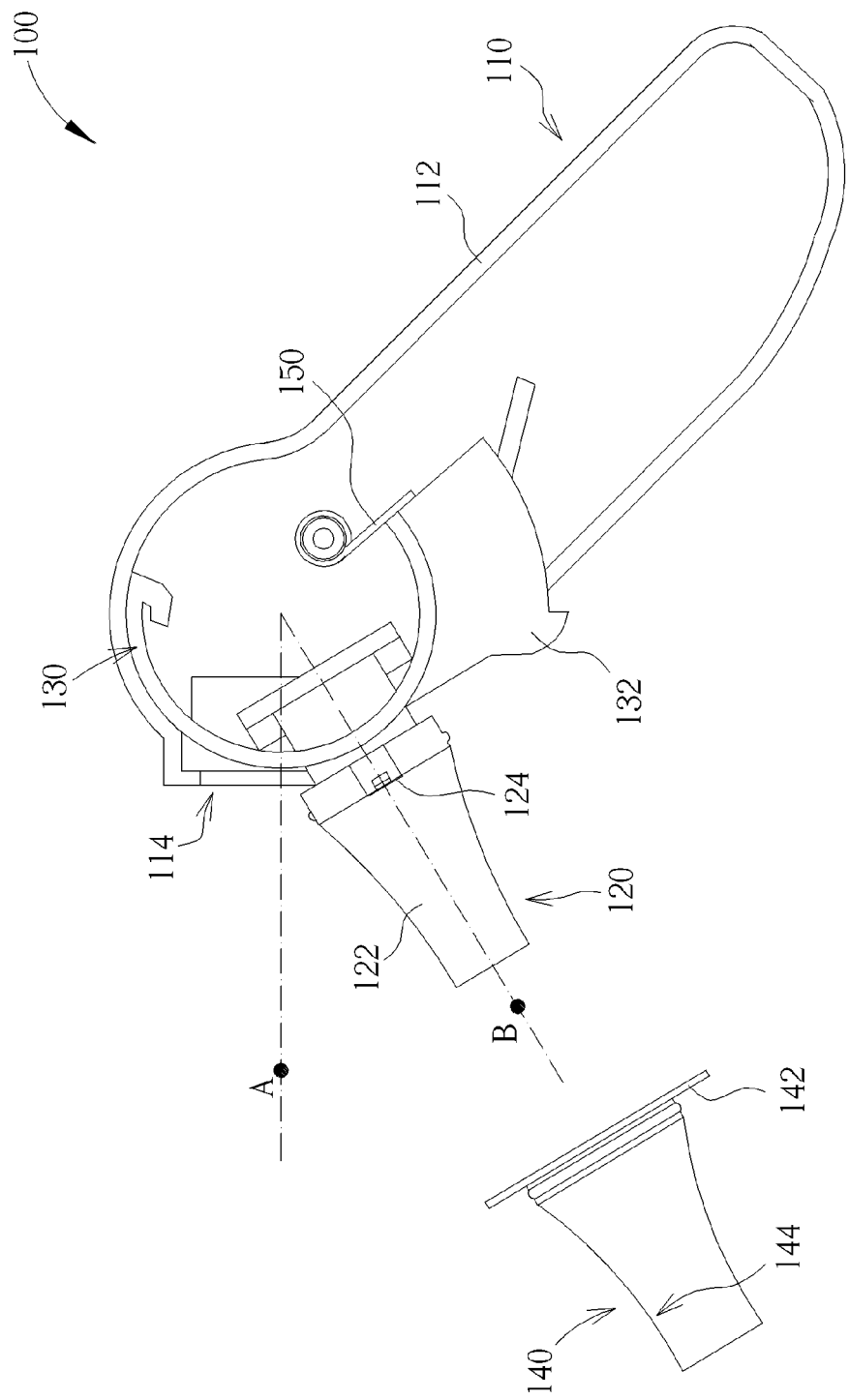
FIG. 3 is a diagram showing the probe of the body temperature measuring device of FIG. 1 located at a second position.

Please refer to FIG. 1 to FIG. 3. FIG. 1 is a diagram showing a first embodiment of a body temperature measuring device of the present invention. FIG. 2 is a diagram showing a probe of the body temperature measuring device of FIG. 1 located at a first position. FIG. 3 is a diagram showing the probe of the body temperature measuring device of FIG. 1 located at a second position. As shown in FIG. 1, the body temperature measuring device 100 of the present invention comprises a main body 110, a probe 120, and a control mechanism 130. The main body 110 comprises a holding part 112, and an abutting surface 114 arranged at a side of the holding part 112. The probe 120 is affixed to the main body 110 in a rotatable manner As shown in FIG. 2, the probe comprises a probe main body 122, and a fixing structure 124 arranged on the probe main body 122 for fixing a probe cover 140. The fixing structure 124 can comprise a fixing hook for hooking and holding an inner wall 144 of the probe cover 140. The probe cover 140 has a bottom edge 142 corresponding to the abutting surface 114 of the main body 110. The control mechanism 130 is coupled to the probe 120 for controlling the probe rotating between a first position A and a second position B. The control mechanism 130 comprises a button 132 arranged below the probe 120.

As shown in FIG. 2 and FIG. 3, the body temperature measuring device 100 can further comprise an elastic element 150 for pushing the control mechanism 130. When the button 132 is not pressed, the elastic element 150 pushes a rear end of the button 132 of the control mechanism 130, so as to make the probe 120 stay at the first position A. When the button 132 is pressed, the button 132 drives the control mechanism 130 to rotate the probe 120 away from the first position A.

When the probe 120 is located at the first position A, the probe cover 140 is able to be fixed on the probe 120; and when the probe 120 moves away from the first position A, the probe 120 is rotated toward the button 132, such that the abutting surface 114 presses the bottom edge 142 of the probe cover 140, and further detaches the probe cover 140 from the probe 120.

According to the above arrangement, a user can first release the button 132 for fixing the probe cover 140 on the probe 120, in order to perform measurement of body temperature. When the measurement of body temperature is finished, the user can press the button 132 to detach the probe cover 140 from the probe 120. Therefore, the probe cover 140 can be quickly and efficiently detached from the probe 120.

Figure 4:
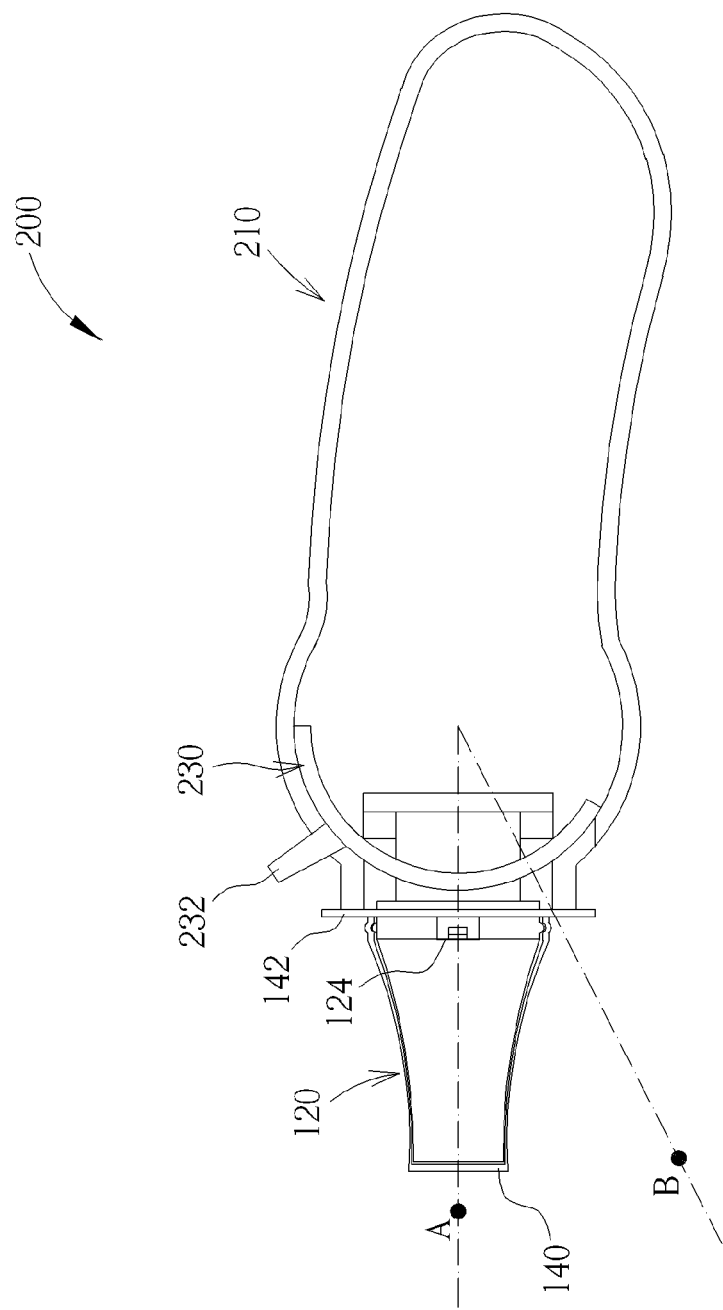
FIG. 4 is a diagram showing a second embodiment of a body temperature measuring device of the present invention.
Figure 5:
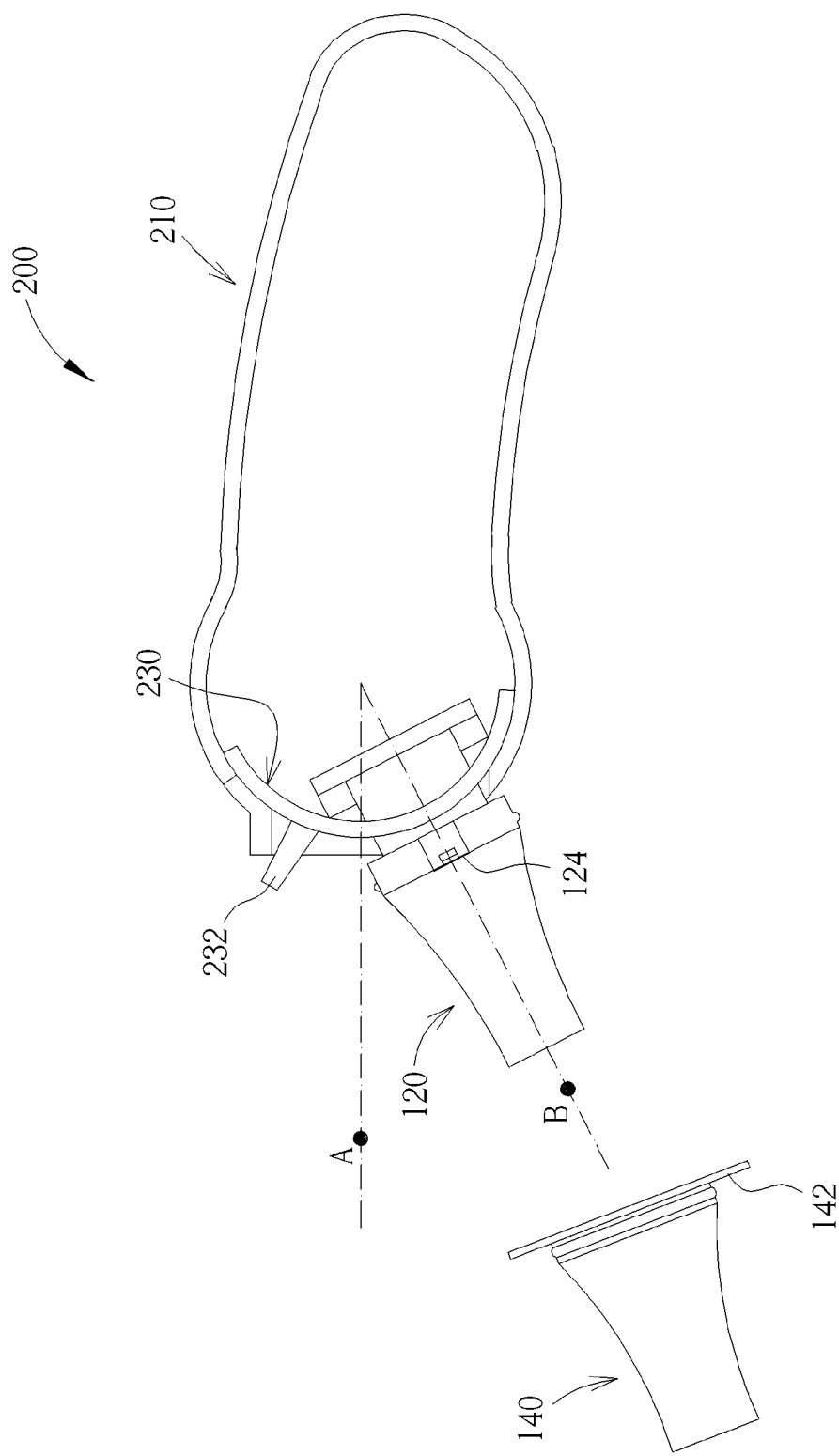
FIG. 5 is a diagram showing a second embodiment of a body temperature measuring device of the present invention.

Please refer to FIG. 4 and FIG. 5 together. FIG. 4 and FIG. 5 are diagrams showing a second embodiment of a body temperature measuring device of the present invention. Major components of the second embodiment are almost identical to major components of the first embodiment. One difference between the first embodiment and the second embodiment is that a control mechanism 230 of the body temperature measuring device 200 comprises a plate body 232 arranged above the probe 120. When the plate body 232 is pushed, the control mechanism 230 is driven to rotate the probe 120 away from the first position A. The body temperature measuring device 200 can also comprise an elastic element (not shown) for applying force to the control mechanism 230, in order to make the probe 120 stay at the first position A.

Please note that operations of the first and second embodiments of the body temperature measuring devices of the present invention are similar, one difference between the first embodiment and the second embodiment is that the probe 120 is moved by pressing the button 132 in the first embodiment, and the probe 120 is moved by pushing the plate body 232 in the second embodiment.

Figure 6:
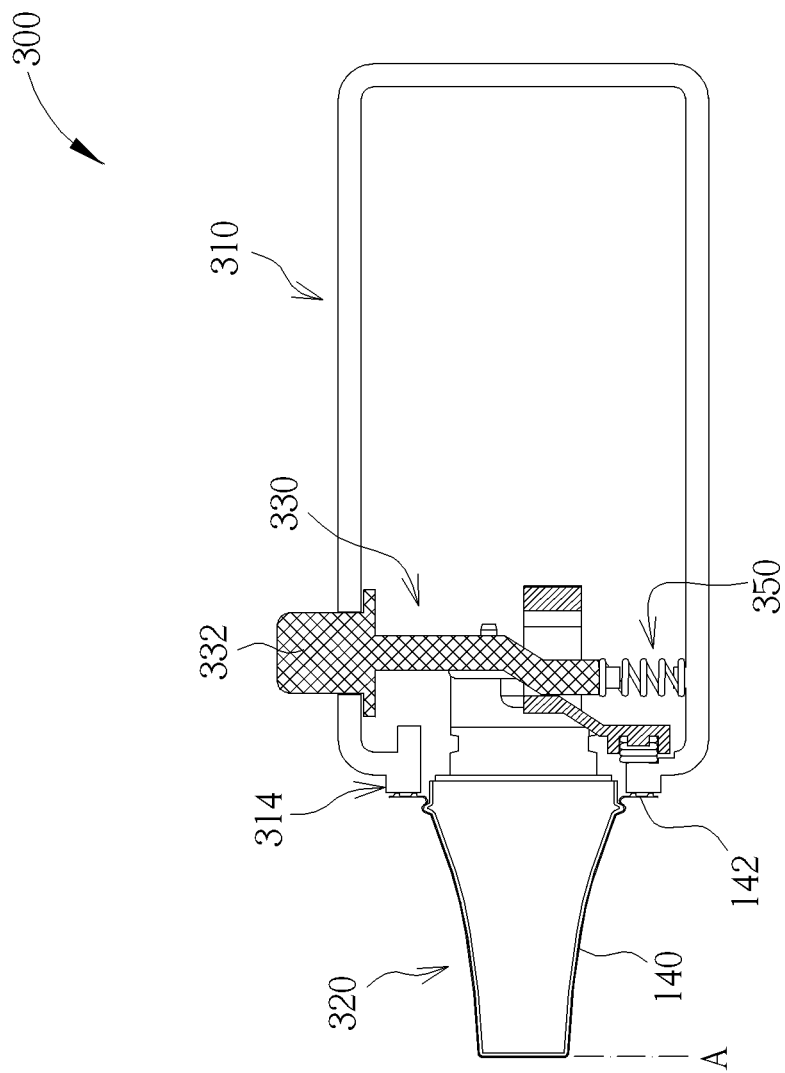
FIG. 6 is a diagram showing a third embodiment of a body temperature measuring device of the present invention.
Figure 7:
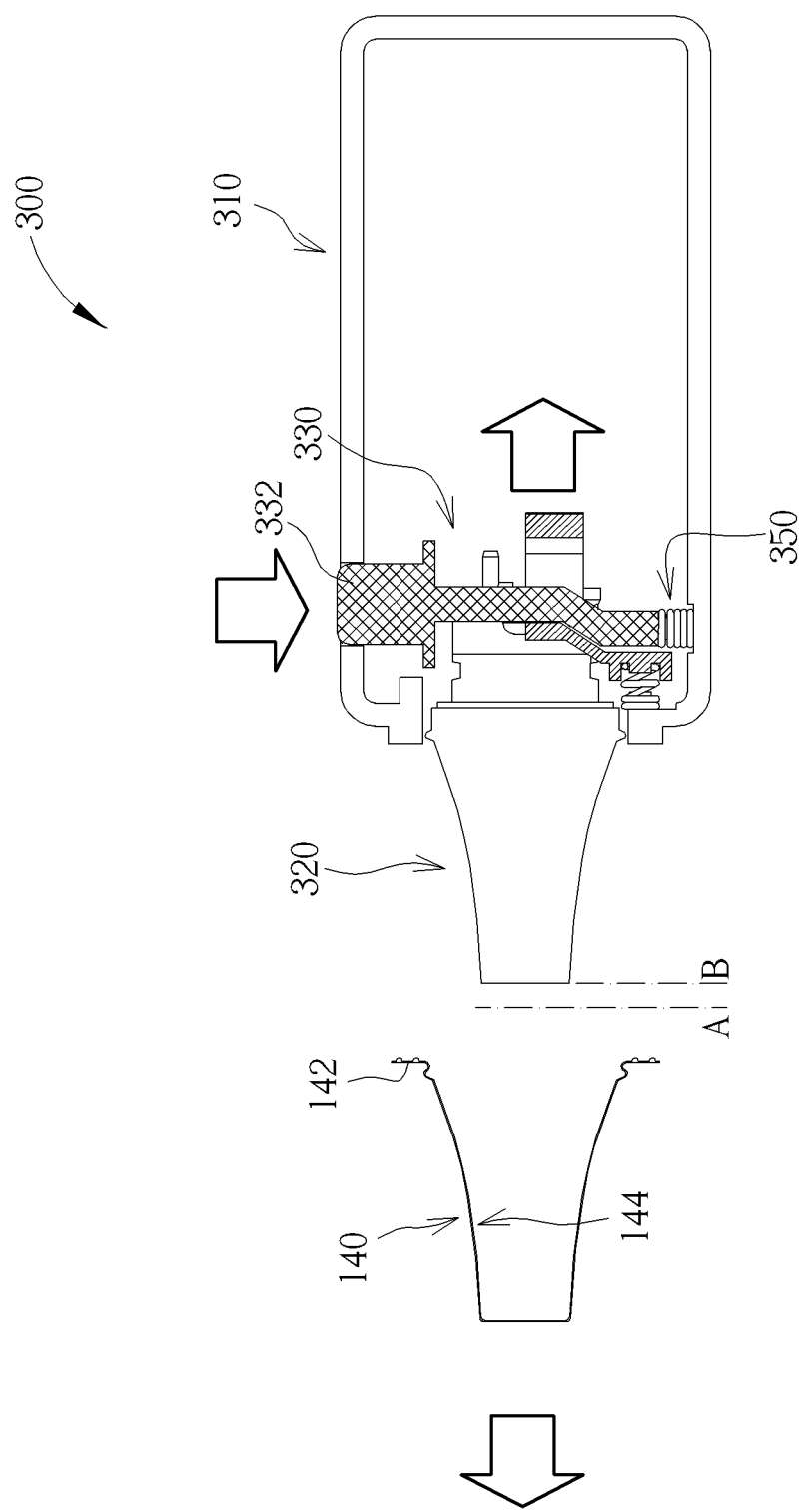
FIG. 7 is a diagram showing a third embodiment of a body temperature measuring device of the present invention.

Please refer to FIG. 6 and FIG. 7 together. FIG. 6 and FIG. 7 are diagrams showing a third embodiment of a body temperature measuring device of the present invention. Major components of the third embodiment are almost identical to the major components of the first embodiment. One difference between the first embodiment and the third embodiment is that the probe 320 of the body temperature measuring device 300 is affixed to the main body 310 in a back-and-forth movable manner And the control mechanism 330 is coupled to the probe 320 for moving the probe 320 back and forth between a first position A and a second position B.

In the third embodiment, when the button 332 is not pressed, the elastic element 350 pushes the control mechanism 330, so as to make the probe 320 stay at the first position A. When the button 332 is pressed, the button 332 drives the control mechanism 330 to inwardly move the probe 320 away from the first position A.

In addition, when the probe 320 is located at the first position A, the probe cover 140 is able to be fixed on the probe 320; and when the probe 320 moves away from the first position A, the probe 320 is drawn inwardly, such that the abutting surface 314 presses the bottom edge 142 of the probe cover 140, and further detaches the probe cover 140 from the probe 320.

Similarly, according to the above arrangement, the user can first release the button 332 for fixing the probe cover 140 on the probe 320, in order to perform measurement of body temperature. When the measurement of body temperature is finished, the user can press the button 332 to detach the probe cover 140 from the probe 320. Therefore, the probe cover 140 can be quickly and efficiently detached from the probe 320.

The body temperature measuring device of the present invention can be applied to an ear thermometer or other types of body temperature measuring devices.

In contrast to the prior art, the body temperature measuring device of the present invention can utilize the control mechanism to quickly and efficiently detach the probe cover without directly applying force to the probe cover by hand for removing the probe cover from the probe. Therefore, the body temperature measuring device of the present invention is more efficient to use.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A body temperature measuring device for a probe cover having a bottom edge, comprising:
   a main body, comprising:
      a holding part; and
      an abutting surface arranged at a side of the holding part for pressing against the bottom edge of the probe cover;
   a probe affixed to the main body in a rotatable manner, wherein the probe comprising:
      a probe main body; and
      a fixing structure arranged on the probe main body for fixing the probe cover; and
   a control mechanism coupled to the probe for controlling the probe to rotate between a first position and a second position;
   wherein when the probe is at the first position, the probe is arranged for being covered by the probe cover at a position that the bottom edge of the probe cover is biased against the abutting surface, and when the probe rotates away from the first position, the abutting surface presses the bottom edge of the probe cover to detach the probe cover from the probe.

2. The body temperature measuring device of claim 1, wherein the control mechanism comprises a plate body arranged above the probe, and when the plate body is pushed, the control mechanism is driven to rotate the probe away from the first position.

3. The body temperature measuring device of claim 1, wherein the control mechanism comprises a button arranged below the probe, and when the button is pressed, the control mechanism is driven to rotate the probe away from the first position.

4. The body temperature measuring device of in claim 1, further comprising an elastic element for driving the control mechanism to rotate the probe to the first position.

5. The body temperature measuring device of claim 1, wherein the fixing structure comprises a fixing hook for hooking and holding an inner wall of the probe cover.

* * * * *